United States Patent
Takamatsu

(10) Patent No.: US 12,015,301 B2
(45) Date of Patent: Jun. 18, 2024

(54) POWER SUPPLY SYSTEM, DC/DC CONVERTER

(71) Applicant: YAZAKI CORPORATION, Tokyo (JP)

(72) Inventor: Hiroaki Takamatsu, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 43 days.

(21) Appl. No.: 17/954,951

(22) Filed: Sep. 28, 2022

(65) Prior Publication Data

US 2023/0095408 A1    Mar. 30, 2023

(30) Foreign Application Priority Data

Sep. 29, 2021   (JP) .................... 2021-158712

(51) Int. Cl.
| H02J 7/34 | (2006.01) |
| B60L 58/20 | (2019.01) |
| H02J 7/00 | (2006.01) |
| H02M 3/158 | (2006.01) |

(52) U.S. Cl.
CPC .............. *H02J 7/342* (2020.01); *B60L 58/20* (2019.02); *H02J 7/0013* (2013.01); *H02J 7/0063* (2013.01); *H02M 3/1582* (2013.01); *B60L 2210/10* (2013.01); *B60L 2270/20* (2013.01); *H02J 2207/20* (2020.01)

(58) Field of Classification Search
CPC .. B60L 2210/10; B60L 58/20; B60L 2270/20; H02J 7/342; H02J 2207/20; H02J 2310/48; B60R 16/03; B60R 16/033
See application file for complete search history.

(56) References Cited

U.S. PATENT DOCUMENTS

| 2018/0287494 A1 | 10/2018 | Yano et al. |
| 2020/0328478 A1 | 10/2020 | Nozawa |
| 2021/0039507 A1 | 2/2021 | Nozawa |
| 2021/0313874 A1* | 10/2021 | Kawakami ............ H02M 3/073 |

FOREIGN PATENT DOCUMENTS

| CN | 205829235 U | 12/2016 |
| CN | 108216086 B | 1/2020 |
| DE | 102018215099 A1 | 3/2019 |
| WO | 2019048806 A1 | 3/2019 |
| WO | WO-2019225396 A1 * | 11/2019 .............. H02M 1/32 |

* cited by examiner

*Primary Examiner* — Ryan Johnson

(74) *Attorney, Agent, or Firm* — Sughrue Mion, PLLC

(57) ABSTRACT

A power supply system including: a first voltage subsystem including a first battery connected to a load via a relay; a second voltage subsystem including a second battery, the second battery having a lower voltage than the first battery; and a DC/DC converter disposed between the first voltage subsystem and the second voltage subsystem, wherein before switching the relay to be closed, the DC/DC converter is configured to: provide a lower voltage than a voltage of the second battery to the first voltage subsystem; subsequently provide the voltage of the second battery to the first voltage subsystem; and subsequently increase the voltage of the second battery to be equal to a voltage of the first battery and provide the voltage of the second battery to the first voltage subsystem.

13 Claims, 4 Drawing Sheets

|    | M-R    | 48V I-Sw | VOLTAGE INCREASE/ DECREASE | PC-Sw  | 12V I-Sw | CAPACITANCE C |
|----|--------|----------|----------------------------|--------|----------|---------------|
| T0 | OPEN   | OPEN     | DEACTIVATED                | OPEN   | OPEN     | 0V            |
| T1 | OPEN   | OPEN     | DEACTIVATED                | CLOSED | OPEN     | 10V           |
| T2 | OPEN   | OPEN     | DEACTIVATED                | OPEN   | CLOSED   | 12V           |
| T3 | OPEN   | CLOSED   | VOLTAGE INCREASE           | OPEN   | CLOSED   | 48V           |
| T4 | CLOSED | –        | –                          | OPEN   | –        | 48V           |

FIG. 3

POWER SUPPLY SYSTEM, DC/DC CONVERTER

BACKGROUND OF THE INVENTION

Technical Field

The present invention relates to a power supply system with two subsystems having different voltages, and to a DC/DC converter for use in such a power supply system.

Background Art

Conventionally, power supply systems are generally configured as 12V power supply systems which supply power from a 12V battery. However, in recent years, 48V power supply systems have been increasingly utilized which supply power from a 48V battery. Utilizing a power supply system with a higher voltage than a conventional power supply system enables a supplied current to be reduced for the same power. This enables that reduction in vehicle weight etc. is expected due to reduced power loss during power transmission and/or a reduced thickness of electric wires. 48V power supply systems are expected to be utilized also in vehicles equipped with autonomous driving systems in the future.

It is assumed that even when utilizing a 48V power supply system, a 12V power supply system is used together with the 48V power supply system within a vehicle for a certain period in order to operate e.g. existing electrics and/or electronics in the vehicle. Combining the 12V system with the 48V system within a vehicle may enable a power supply redundant system to be achieved which provides for redundancy of power supply.

CITATION LIST

Patent Literature

Patent Document 1: JP 2021-29078 A

SUMMARY OF THE INVENTION

FIG. 4 shows a block diagram illustrating a power supply system 300 for an automobile which is with a 12V subsystem and 48V subsystem together. In the 12V subsystem, a 12V battery 310 supplies power to a 12V load 320, as shown in FIG. 4. In the 48V subsystem, a 48V battery 330 supplies power to a 48V load 340 via a main relay 350. As the main relay 350, a mechanical relay is generally used.

A DC/DC converter 360 is arranged between the 12V subsystem and 48V subsystem, wherein the DC/DC converter 360 is configured to be operated bidirectionally so that mutual power exchange is possible between the 12V and 48V subsystems.

The DC/DC converter 360 includes a boost and buck circuit 361, a 12V-side insulation switch 362 for switching a connected state of the DC/DC converter 360 to the 12V battery 310, a 48V-side insulation switch 363 for switching a connected state of the DC/DC converter 360 to the 48V battery 330, and a controller 364.

The 12V-side insulation switch 362 and the 48V-side insulation switch 363 are formed by MOSFETs, wherein the 12V-side insulation switch 362 is configured with back-to-back connection in order to prevent current backflow. The controller 364 is formed e.g. by a CPU and configured to control boost/buck operation of the boost and buck circuit 361 as well as opening/closing operation of the 12V-side insulation switch 362 and/or the 48V-side insulation switch 363.

In the 48V subsystem, a capacitance C exists in parallel to the 48V load 340. This is a capacitance which is generated e.g. by a capacitive component which is inherent to the 48V load 340, and/or by a stray capacitance(s) existing in the 48V subsystem. Generally, the capacitance C is discharged when the ignition is switched off and the main relay 350 is switched to be opened.

In the power supply system 300, when the main relay 350 is switched to be closed from its open state with the capacitance C being not charged, a high inrush current flows into the main relay 350 from the 48V battery 330, which may result in welding the main relay 350.

In the power supply system 300, the capacitance C is precharged by means of the 12V battery 310 in order to prevent the main relay 350 to be welded due to such an inrush current. More specifically, prior to switching the main relay 350 to be closed, the capacitance C is charged with a voltage of 12V supplied by the 12V battery 310, and the DC/DC converter 360 is then operated to increase the voltage from 12V to 48V for charging the capacitance C. By using such a stepwise charging sequence, a voltage difference between the 48V battery 330 and the capacitance C is eliminated before switching the main relay 350 to be closed. In this manner, the main relay 350 is prevented to be welded due to the inrush current.

On the other hand, an inrush current is also generated during precharging the capacitance C by means of the 12V battery 310, wherein the inrush current will flow through the DC/DC converter 360 from the 12V battery 310 into the capacitance C. This inrush current may result in load applied to an internal circuitry of the DC/DC converter 360, particularly to the 12V-side insulation switch 362. This problem may occur not only with automotive power supply systems, but also with any power supply system which includes two different batteries having different voltages and a DC/DC converter.

Therefore, an objective of the present invention is to provide a power supply system including a DC/DC converter and batteries in two subsystems having different voltages which enables an internal circuit of the DC/DC converter to be protected during precharging for high voltage side relay protection.

In order to achieve the objective as described above, a power supply system according to a first aspect of the present invention includes: a first voltage subsystem including a first battery connected to a load via a relay; a second voltage subsystem including a second battery, the second battery having a lower voltage than the first battery; and a DC/DC converter disposed between the first voltage subsystem and the second voltage subsystem, wherein before switching the relay to be closed, the DC/DC converter is configured to: provide a lower voltage than a voltage of the second battery to the first voltage subsystem; subsequently provide the voltage of the second battery to the first voltage subsystem; and subsequently increase the voltage of the second battery to be equal to a voltage of the first battery and provide the voltage of the second battery to the first voltage subsystem.

In order to achieve the objective as described above, a DC/DC converter according to a second aspect of the present invention is configured to be disposed between a first voltage subsystem and a second voltage subsystem, wherein the first voltage subsystem includes a first battery connected to a load via a relay and the second voltage subsystem includes a second battery, the second battery having a lower voltage than the first battery, wherein before switching the relay to be closed, the DC/DC converter is configured to: provide a lower voltage than a voltage of the second battery to the first voltage subsystem; subsequently provide the voltage of the second battery to the first voltage subsystem; and subsequently increase the voltage of the second battery to be equal to a voltage of the first battery and provide the voltage of the second battery to the first voltage subsystem.

BRIEF DESCRIPTION OF THE DRAWINGS

FIG. 3 shows illustration of operation of the power supply system according to the embodiment.

DETAILED DESCRIPTION OF PREFERRED EMBODIMENTS

Figure 1:
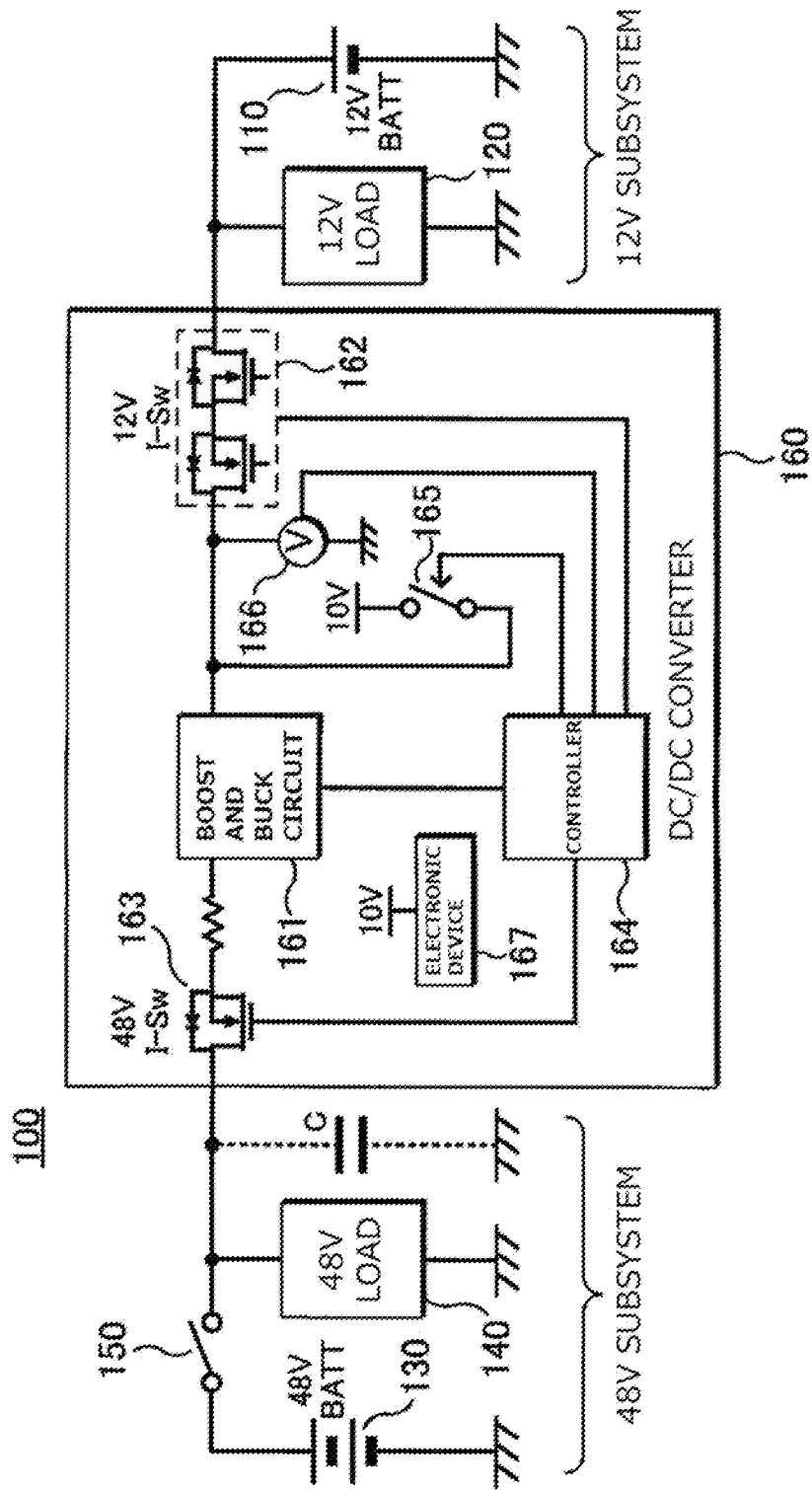
FIG. 1 shows a configuration of a power supply system according to an embodiment.

Embodiments of the present invention will be described in details with reference to the Drawings. FIG. 1 shows a configuration of a power supply system according to an embodiment. The power supply system 100 is an automotive power supply system including two voltage subsystems together, in this example a 12V voltage subsystem and a 48V voltage subsystem. However, it is to be noted that the present invention is not limited to automotive power supply systems having a 12V and a 48V subsystem, but may be also applied to a wide variety of power supply systems which have two different batteries with different voltages.

As shown in this figure, the 12V subsystem includes a 12V battery 110 and a 12V load 120, wherein the 12V battery 110 supplies power to the 12V load 120. The 48V subsystem includes a 48V battery 130 and a 48V load 140, wherein the 48V battery 130 is supplying power to the 48V load 140 via a main relay 150. Further, an ISG (generator with a motor function) may be provided for supplying power to the 48V load 140. A mechanical relay is used as the main relay 150, wherein the main relay 150 is configured to be switched to be closed e.g. via an ignition signal which is indicative of ignition having been switched on.

A DC/DC converter 160 is arranged between the 12V subsystem and 48V subsystem, wherein the DC/DC converter 360 is configured to be operated bidirectionally so that mutual power exchange is possible between the 12V and 48V subsystems. For example, the DC/DC converter 160 may increase a voltage of 12V in order to charge the 48V battery 130, and/or decrease a voltage of 48V in order to charge the 12V battery 110. In addition, when e.g. a failure occurs in one battery, this may be compensated by the other battery. Moreover, both batteries may supply power to one load.

In the 48V subsystem, a capacitance C exists in parallel to the 48V load 140. This is a capacitance which is generated e.g. by a capacitive component which is inherent to the 48V load 140, and/or by a stray capacitance(s) existing in the 48V subsystem.

The DC/DC converter 160 includes a boost and buck circuit 161, a 12V-side insulation switch 162, a 48V-side insulation switch 163, and a controller 164. The 12V-side insulation switch 162 is disposed on a buck output side of the boost and buck circuit 161, and is connected to the 12V subsystem. The 12V-side insulation switch 162 is formed by two MOSFETs which are connected in a back-to-back manner. The 48V-side insulation switch 163 is disposed on a boost output side of the boost and buck circuit 161, and is connected to the 48V subsystem. The 48V-side insulation switch 163 is by a MOSFET, wherein a body diode of the MOSFET is arranged with its forward direction toward the 48V side.

The DC/DC converter 160 further includes a precharge switch 165 and a voltage sensor 166 between the boost and buck circuit 161 and the 12V-side insulation switch 162, wherein the precharge switch 165 is configured to switch connection/disconnection of a 10V power supply. However, it is sufficient to arrange the precharge switch 165 on a side of the DC/DC converter 160 which is closer to the 48V subsystem with respect to the 12V-side insulation switch 162.

As the 10V power supply, e.g. a conventional one may be applied which is supplied with power by the 12V battery 110 and is already provided e.g. for supplying an electronic device 167 with power, such as an IC included in the DC/DC converter 160. Using such an existing power supply eliminates the necessity for a new additional power supply circuit for the 10V power supply. Here, it is to be noted that the power supply is not limited to a 10V power supply, but may be any power supply which has a lower voltage for operating an electronic device included in the DC/DC converter 160 than 12V provided by the 12V battery 110.

Figure 2:
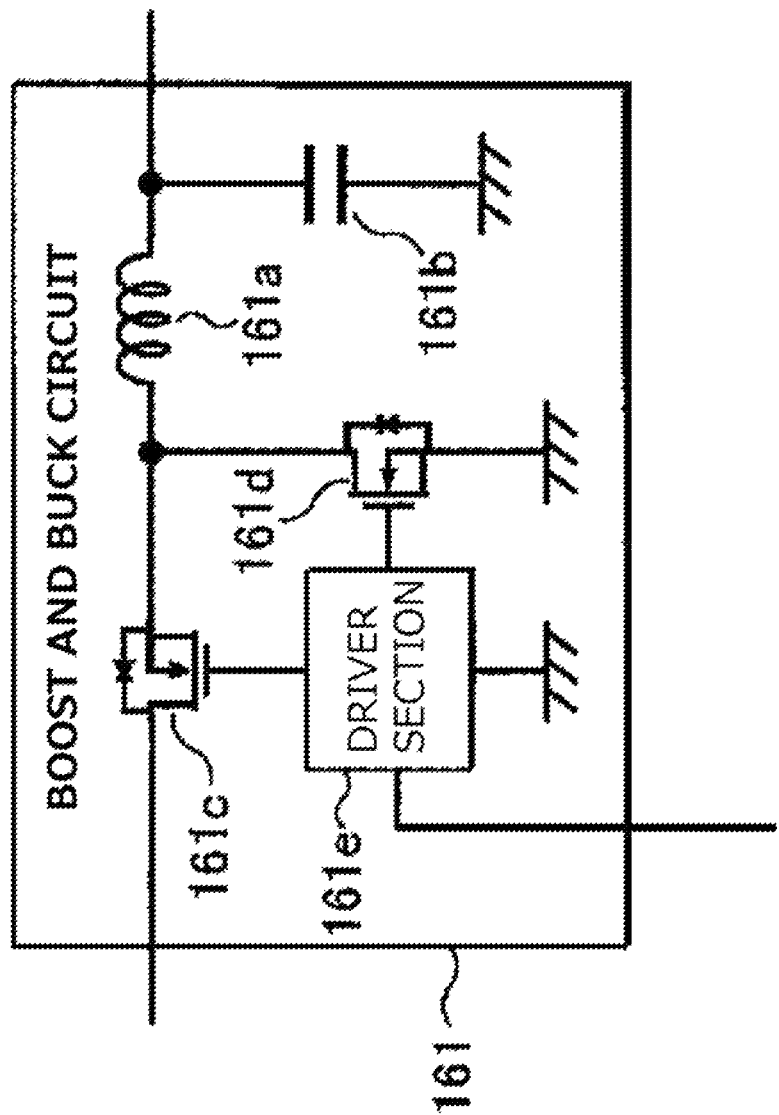
FIG. 2 shows an exemplar configuration of a boost and buck circuit.
Figure 4:
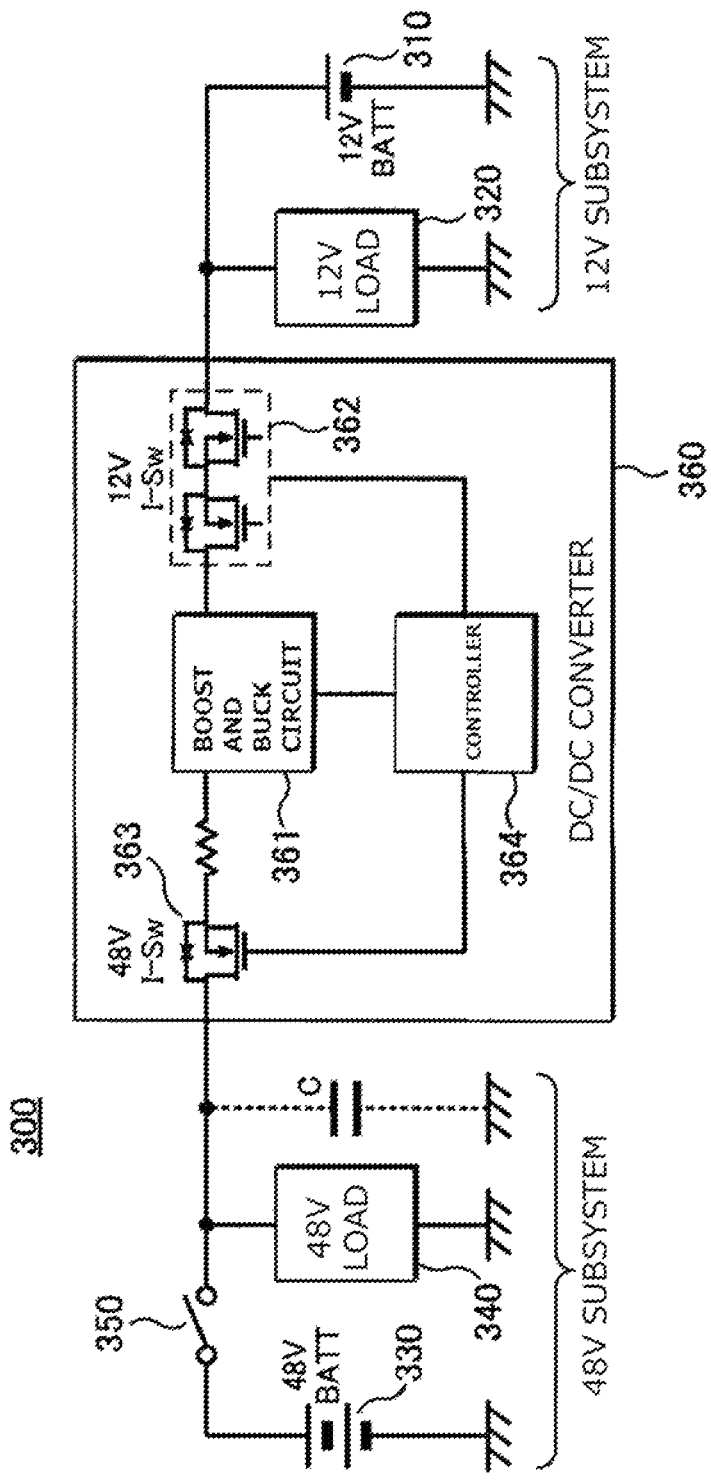
FIG. 4 shows a configuration of a conventional power supply system equipped with batteries of two subsystems.

As the boost and buck circuit 161, an existing circuit may be applied. For example, the boost and buck circuit 161 may be configured as shown in FIG. 2. In the example of this figure, a coil 161a and a switching element 161c are connected in series between a buck output side and a boost output side of the boost and buck circuit 161, wherein a capacitor 161b is connected between the buck output side and ground. Here, the switching element 161c is arranged such that its body diode has a forward direction toward the boost output side.

Further, a switching element 161d is connected between the ground and a node between the coil 161a and the switching element 161c. Here, the switching element 161d is arranged such that its body diode has a forward direction which is opposite to the ground.

The driver section 161e is configured to drive the switching element 161c and the switching element 161d under control of the controller 164. More specifically, for buck operation, the driver section 161e drives the switching element 161c to be switched on/off with the switching element 161d being in an off-state. For boost operation, the driver section 161e drives the switching element 161d to be switched on/off with the switching element 161c being in an off-state.

The controller 164 is formed e.g. by a CPU and configured to control the boost and buck operation of the boost and buck circuit 161 as well as opening/closing operation of the 12V-side insulation switch 162, 48V-side insulation switch 163 and precharge switch 165 as described below, based on an ignition signal and a detection result of the voltage sensor 166, wherein the ignition signal is indicative of the ignition being on.

Next, operation of the power supply system according to the present embodiment will be described with reference to FIG. 3. FIG. 3 shows temporal courses of the open/closed state of the main relay 150 controlled by a higher-level system, open/closed states of the 12V-side insulation switch 162, 48V-side insulation switch 163 and precharge switch 165 controlled by the controller 164, operation state of the boost and buck circuit 161, as well as a charged voltage of the capacitance C.

First, in an initial state T0 of the ignition which is off, the main relay 150 is in an open state, wherein the capacitance C is discharged and has a voltage of 0V. The controller 164 controls the 12V-side insulation switch 162, 48V-side insulation switch 163 and precharge switch 165 to be opened and deactivates the boost and buck circuit 161.

When the ignition signal is provided to the controller 164 at T1, wherein the ignition signal indicates the ignition being on, the controller 164 perform the following control at T1 to T3 before the main relay 150 is switched to be closed by the higher-level system at T4.

First, at T1, the controller 164 controls the precharge switch 165 to be closed. In this manner, a voltage of 10V is applied between the boost and buck circuit 161 and the 12V-side insulation switch 162, and the capacitance C is charged to 10V via the body diodes of the switching element 161c and the 48V-side insulation switch 163 in the boost and buck circuit 161 in the deactivated state.

When based on an output signal from the voltage sensor 166, it is detected that the capacitance C has been charged to 10V, the controller 164 controls the 12V-side insulation switch 162 to be closed at T2. In this manner, a voltage of 12V is applied via the 12V-side insulation switch 162 from the 12V battery 110, and the capacitance C is charged to 12V via the body diode of the switching element 161c and the body diode of the 48V-side insulation switch 163 in the boost and buck circuit 161 in the deactivated state. In order to prevent backflow to the 10V power supply during this process, the precharge switch 165 is switched to be open at T2.

Immediately before initiating charging the capacitance C to 12V, the capacitance C is charged to 10V by the precharge switch 165. Therefore, only an inrush current corresponding to the difference of 2V will flow into the 12V-side insulation switch 162 in the closed state, which results in a sufficiently reduced load applied to the 12V-side insulation switch 162.

When based on the output signal from the voltage sensor 166, it is detected that the capacitance C has been charged to 12V, the controller 164 controls the boost and buck circuit 161 to perform boost operation for increasing the voltage of 12V supplied by the 12V battery 110 to 48V at T4, wherein the controller 164 simultaneously controls the 48V-side insulation switch 163 to be closed. In this manner, the capacitance C is charged to 48V. The capacitance C may be charged to 48V via the body diode of the 48V-side insulation switch 163 with the 48V-side insulation switch 163 remaining in an open state.

Then, the higher-level system controls the main relay 150 to be closed at T4. Since the capacitance C is charged to 48V in advance, no inrush current is generated, and the main relay 150 may not be welded. It is to be noted that after T4, the controller 164 maintains the precharge switch 165 to be open, while the open/closed states of the 12V-side insulation switch 162, 48V-side insulation switch 163 as well as the operation state of the boost and buck circuit 161 are adaptively controlled by the controller 164 e.g. depending on a driving state of an automobile and/or state of charge of the batteries.

As described above, the power supply system 100 according to the present embodiment is configured to perform the stepwise precharging in which the capacitance C is charged with a lower voltage than 12V provided by the 12V battery 110, and thereafter charged with the voltage of 12V. In this manner, only an inrush current corresponding to a voltage difference between 12V and the lower voltage will flow into the internal circuitry of the DC/DC converter 160. Therefore, it is possible to protect the internal circuitry of DC/DC converter 160 from the inrush current during precharging.

Furthermore, for the voltage lower than 12V, a voltage may be applied which is supplied by the 12V battery 110 as a voltage source and is provided for supplying the electronic device 167 included in the DC/DC converter 160. Therefore, it is not necessary to provide a new additional power supply for precharging with the voltage lower than 12V, wherein the precharging may be achieved with a simplified configuration.

REFERENCE SIGNS LIST

100 Power supply system
110 12V battery
120 12V load
130 48V battery
140 48V load
150 Main relay
160 DC/DC converter
161 Boost and buck circuit
161a Coil
161b Capacitor
161c Switching element
161d Switching element
161e Driver section
162 12V-side insulation switch
163 48V-side insulation switch
164 Controller
165 Precharge switch
166 Voltage sensor
167 Electronic device

What is claimed is:
1. A power supply system comprising:
a first voltage subsystem including a first battery connected to a load via a relay;
a second voltage subsystem including a second battery, the second battery having a lower voltage than the first battery; and
a DC/DC converter disposed between the first voltage subsystem and the second voltage subsystem,
wherein before switching the relay to be closed, the DC/DC converter is configured to:
provide a lower voltage than a voltage of the second battery to the first voltage subsystem;
subsequently provide the voltage of the second battery to the first voltage subsystem; and
subsequently increase the voltage of the second battery to be equal to a voltage of the first battery and provide the increased voltage of the second battery to the first voltage subsystem.
2. The power supply system according to claim 1, wherein the DC/DC converter includes an electronic device configured to be operated with a lower voltage than the voltage of the second battery.
3. The power supply system according to claim 1, wherein the DC/DC converter includes a switch configured to switch a connected state of the DC/DC converter to the second battery, and
wherein the DC/DC converter is configured to provide, from a side closer to the first voltage subsystem with respect to the switch, the lower voltage than the voltage of the second battery to the first voltage subsystem.

4. The power supply system according to claim 2,
wherein the DC/DC converter includes a switch configured to switch a connected state of the DC/DC converter to the second battery, and
wherein the DC/DC converter is configured to provide, from a side closer to the first voltage subsystem with respect to the switch, the lower voltage than the voltage of the second battery to the first voltage subsystem.

5. The power supply system according to claim 1, further comprising a voltage sensor,
wherein subsequently providing the voltage of the second battery to the first voltage subsystem is initiated upon detecting by means of the voltage sensor that the voltage of the lower voltage than the voltage of the second battery has been provided to the first voltage subsystem, and
wherein subsequently increasing the voltage of the second battery to be equal to the voltage of the first battery and providing the increased voltage of the second battery to the first voltage subsystem is initiated upon detecting by means of the voltage sensor that the voltage of the second battery has been provided to the first voltage subsystem.

6. The power supply system according to claim 1,
wherein the DC/DC converter includes a precharge switch and a power supply configured to provide the lower voltage than the voltage of the second battery,
wherein the DC/DC converter is configured to provide the lower voltage than the voltage of the second battery to the first voltage subsystem by controlling the precharge switch to be closed.

7. The power supply system according to claim 6,
wherein the DC/DC converter further includes a boost and buck circuit and a switch, the switch being configured to switch a connected state of the boost and buck circuit to the second battery,
wherein the power supply is connected between the switch and the first voltage subsystem, and
wherein the precharge switch is configured to switch connection/disconnection of the power supply to the first voltage subsystem.

8. The power supply system according to claim 6, wherein the DC/DC converter is configured to provide the lower voltage than the voltage of the second battery to the first voltage subsystem while the second battery is electrically disconnected from the DC/DC converter and the first voltage subsystem.

9. A DC/DC converter configured to be disposed between a first voltage subsystem and a second voltage subsystem, wherein the first voltage subsystem includes a first battery connected to a load via a relay and the second voltage subsystem includes a second battery, the second battery having a lower voltage than the first battery,
wherein before switching the relay to be closed, the DC/DC converter is configured to:
provide a lower voltage than a voltage of the second battery to the first voltage subsystem;
subsequently provide the voltage of the second battery to the first voltage subsystem; and
subsequently increase the voltage of the second battery to be equal to a voltage of the first battery and provide the increased voltage of the second battery to the first voltage subsystem.

10. The DC/DC converter according to claim 9, further comprising a voltage sensor,
wherein subsequently providing the voltage of the second battery to the first voltage subsystem is initiated upon detecting by means of the voltage sensor that the voltage of the lower voltage than the voltage of the second battery has been provided to the first voltage subsystem, and
wherein subsequently increasing the voltage of the second battery to be equal to the voltage of the first battery and providing the increased voltage of the second battery to the first voltage subsystem is initiated upon detecting by means of the voltage sensor that the voltage of the second battery has been provided to the first voltage subsystem.

11. The DC/DC converter according to claim 9, comprising a precharge switch and a power supply configured to provide the lower voltage than the voltage of the second battery,
wherein the DC/DC converter is configured to provide the lower voltage than the voltage of the second battery to the first voltage subsystem by controlling the precharge switch to be closed.

12. The DC/DC converter according to claim 11,
wherein the DC/DC converter further includes a boost and buck circuit and a switch, the switch being configured to switch a connected state of the boost and buck circuit to the second battery,
wherein the power supply is connected between the switch and a connection portion of the DC/DC converter, the connection portion being configured to connect the DC/DC converter to the first voltage subsystem, and
wherein the precharge switch is configured to switch connection/disconnection of the power supply to the first voltage subsystem.

13. The DC/DC converter according to claim 11, wherein the DC/DC converter is configured to provide the lower voltage than the voltage of the second battery to the first voltage subsystem while the second battery is electrically disconnected from the DC/DC converter and the first voltage subsystem.

* * * * *